United States Patent [19]
Mochimaru et al.

[11] 3,884,576
[45] May 20, 1975

[54] EXPOSURE UNIT FOR A COPYING MACHINE HAVING A VARIABLE MAGNIFICATION

[75] Inventors: Hideaki Mochimaru; Shigeru Suzuki, both of Yokohama; Yohei Ikezu, Tokyo; Masao Yaeshima, Sendai; Takeshi Ukai, Tokyo, all of Japan

[73] Assignee: Ricoh Co., Ltd., Tokyo, Japan

[22] Filed: Dec. 3, 1973

[21] Appl. No.: 421,324

[30] Foreign Application Priority Data
Dec. 15, 1972 Japan.............................. 47-12588
Dec. 29, 1972 Japan.............................. 47-03737

[52] U.S. Cl..................................... 355/69; 355/70
[51] Int. Cl. ........................................... G03b 27/76

[58] Field of Search........................ 355/67, 69, 70

[56] References Cited
UNITED STATES PATENTS
2,561,535   7/1951   Paulet et al........................... 355/69
3,227,039   1/1966   Simmon............................ 355/69 X

*Primary Examiner*—Richard A. Wintercorn
*Attorney, Agent, or Firm*—Cooper, Dunham, Clark, Griffin & Moran

[57] ABSTRACT

In a copying machine having a variable magnification, a plurality of light sources are used to provide an exposure. By controlling the respective timer periods during which the plurality of light sources are energized, the distribution of the exposure is maintained uniform.

7 Claims, 5 Drawing Figures

EXPOSURE UNIT FOR A COPYING MACHINE HAVING A VARIABLE MAGNIFICATION

BACKGROUND OF THE INVENTION

The invention relates to an exposure unit for a copying machine having a variable magnification.

In a copying machine having a variable magnification mechanism, the magnification used in copying an original is varied by moving the lens and reflecting mirror contained in an exposure unit by means of the mechanism. This results in a displacement of the optical axis of the exposure unit, and the marginal area of the original will be focussed through the peripheral region of the lens. As is known, the amount of light passing through the peripheral region of the lens will be reduced by a factor of $1/\cos^4\theta$ as compared with that passing through the center of the lens, $\theta$ being the angle of incidence. As a result, when the original is uniformly illuminated by the light source of the exposure unit, that portion of the image on a photosensitive member which is formed by light passing through the peripheral region of the lens will be substantially darkened, thereby causing a non-uniformity in exposure. This has been avoided in the prior art copying machine by moving other components thereof in interlocked relationship with the variable magnification mechanism so as to prevent a displacement of the optical axis of the exposure unit, but the resulting construction became complex and bulky.

SUMMARY OF THE INVENTION

It is an object of the invention to provide an exposure unit for a copying machine having a variable magnification which is made simple in arrangement and compact in construction by maintaining uniform exposure distribution through the control of the time periods during which a plurality of light sources are energized.

DETAILED DESCRIPTION OF THE PREFERRED EMBODIMENT

Figure 1:
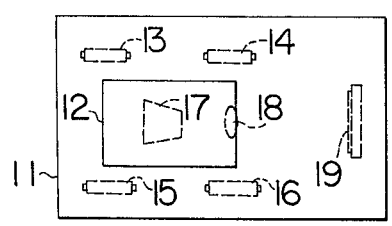
FIGS. 1 and 2 are a top view and a side elevation of a copying machine having a variable magnification incorporating the invention.
Figure 2:
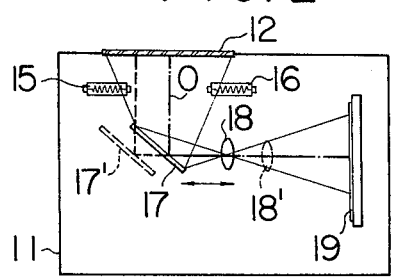
Figure 3:
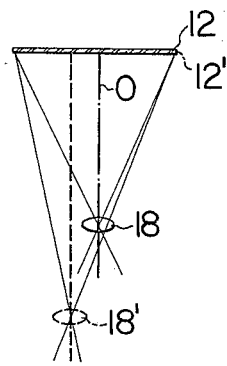
FIG. 3 is a schematic view illustrating part of the copying machine.

Referring to FIGS. 1 and 2, there is shown a copying machine 11 having a variable magnification which includes an exposure unit and which is adapted to effect a copying operation by the electrophotographic process. At its top, the machine includes a transparent glass plate 12 for receiving an original, the original to be copied being place face down on the glass plate 12. The original is illuminated through the glass plate 12 from below by lamps 13 to 16 which are housed in the interior of the copying machine and form a plurality of light sources. The reflected light from the original passes through the glass plate and is reflected by a reflecting mirror 17 located within the copying machine to be focussed by a lens 18 onto a photosensitive member 19. The lamps 13 to 16, glass plate 12, reflecting mirror 17 and lens 18 constitute together an exposure unit. The reflecting mirror 17 and lens 18 are adapted to be movable in the direction indicated by a both-ended arrow by a variable magnification mechanism. When an original is to be copied on a reduced or enlarged scale, the variable magnification mechanism is manually operated to preset a copying magnification, and these optical members are moved to positions dependent on such magnification, for example, to positions 17' and 18' shown in chain lines. Considering the optical relationship between the glass plate 12 and the lens 18, omitting the reflecting mirror 17, it is seen from FIG. 3 that the optical axis 0 also moves upon movement of these optical members. This results in a portion of the original being focussed through the peripheral region of the lens onto the photosensitive member 19 so that its exposure is substantially reduced. For example, when the lens 18 and the reflecting mirror 17 are located in the position shown in chain lines, a portion of the original which is located directly above the end portion 12' of the glass plate 12 will be darkened when focussed as an image. It is to be noted that the lamps 13 to 16 are arranged to illuminate the marginal area of the original with a greater illuminance than the center of the original when copying with a unity magnification so that the distribution of the exposure is uniform over the photosensitive member 19, but the amount of exposure is generally increased when the magnification is reduced while the amount of exposure will be generally reduced when the magnification is increased.

In accordance with the invention, a uniform exposure distribution is assured by controlling the time periods during which a plurality of lamps 13 to 16 are respectively energized. The plurality of lamps 13 to 16 are divided into a plurality of groups, the lamps in each group being energized for a period of time established by an associated timer. Since the lamps 13 to 16 must be energized for varying period of time to correct for an amount of exposure when the optical axis is moved by the variable magnification mechanism, these lamps are sequentially arranged along the direction in which the optical axis travels. The correction of the amount of exposure is automatically effected by adjusting a variable resistor contained in a timer by interlocking it with the variable magnification mechanism. Another variable resistor contained in the timer is varied by means of an exposure dial to adjust the timer period without changing the ratio of time periods of the respective timers, thereby varying the exposure distribution in a uniform manner.

Figure 4:
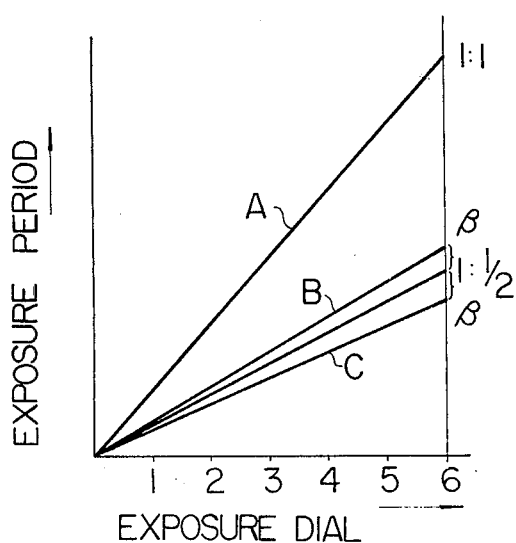
FIG. 4 graphically shows the characteristics of the copying machine.

More specifically, referring to FIG. 4, graph A shows the relationship between the exposure period and the setting of the exposure dial when the copying is effected with a unity magnification and thus without no displacement of the optical axis. When the copying magnification is reduced to 1 : 1/2, the illuminance on the photosensitive member will be increased by a factor of $\alpha$, and therefore it is necessary to reduce the time periods during which the lamps in the respective groups are energized by a factor of $1/\alpha^2$ in order to maintain a constant amount of exposure. Representing the time period which must be added or subtracted from the energization time period of the lamps 13, 14 and the lamps 15, 16 as a result of a displacement of the optical axis by $\beta$, respectively, the exposure periods for the lamps 13, 15 and the lamps 14, 16 will be $1/\alpha^2 - \beta$ and $1/\alpha^2 + \beta$, respectively, these being represented by graphs B and C.

Figure 5:
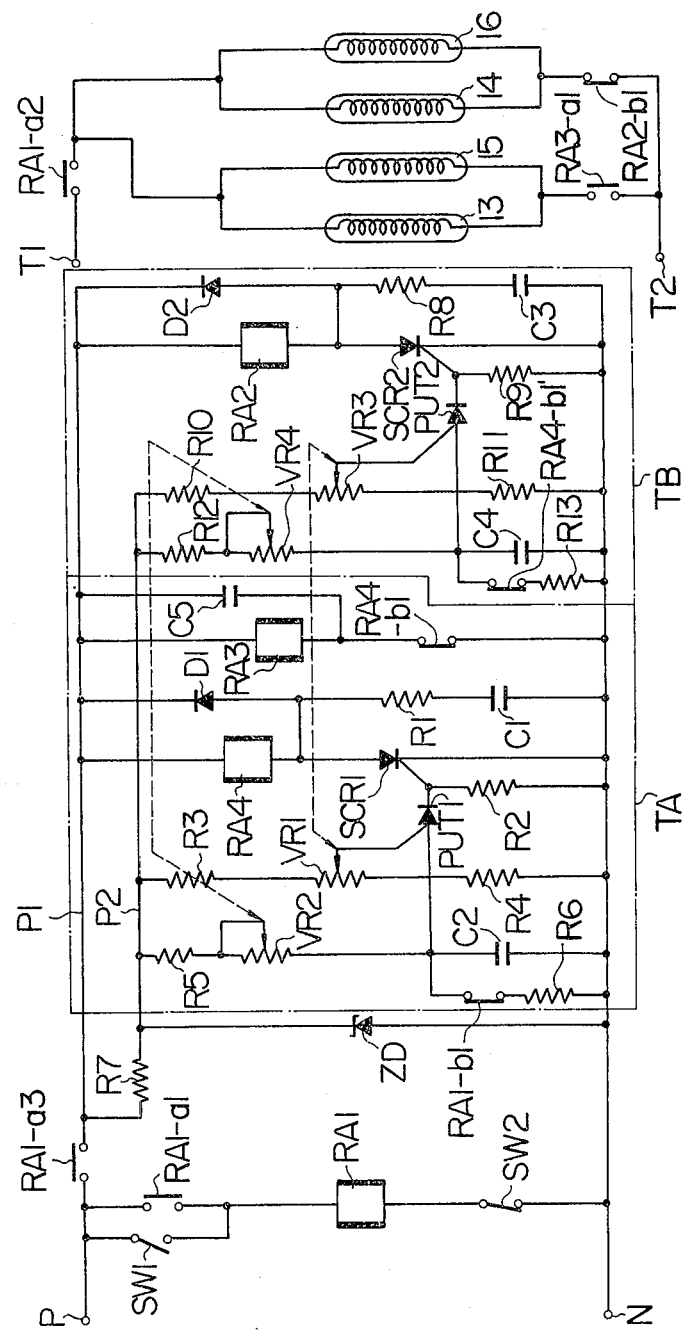
FIG. 5 is a circuit diagram showing one embodiment of the invention.

Referring to FIG. 5, a control of the lamps 13 to 16 will be described. The control includes a switch SW1 which is closed at a predetermined time interval after the depression of a print switch which initiates a copying operation. The switch SW1 is connected in series with a relay coil RA1 and a reset switch SW2 across a pair of terminals P and N, across which a d.c. power supply is connected. When the switch SW1 is closed, the relay coil RA1 is energized, whereby its normally open contact RA1-$a$1 connected in parallel with the switch SW1 is closed to self-hold this relay, and its normally open contacts RA1-$a$2 and RA1-$a$3 are also closed. The lamps 14 and 16 are connected in a parallel combination in series with the normally open contact RA1-$a$2 and a normally closed contact RA2-$b$1 associated with a relay coil RA2 across a pair of terminals T1 and T2, across which an a.c. supply is connected. These lamps are illuminated upon closure of the normally open contact RA1-$a$2. The closure of the normally open contact RA1-$a$3 connects a line P1 with the terminal P. A relay coil RA3 shunted by a capacitor C5 is connected in series with a normally closed contact RA4-$b$1 associated with a relay coil RA4 across the line P1 and the terminal N, and is energized upon closure of the normally open contact RA1-$a$3 to close its normally open contact RA3-$a$1. The lamps 13, 15 are connected in a parallel combination in series with normally open contacts RA1-$a$2 and RA3-$a$1 across the terminals T1 and T2, and begin to be illuminated when the normally open contact RA3-$a$1 is closed. A thyristor SCR1 has its anode connected with the line P1 through a relay coil RA4 and its cathode with the terminal N. A diode D1 has its cathode connected with the line P1 and its anode connected in series with a resistor R1 and a capacitor C1 with the terminal N and also connected with the junction between the relay coil RA4 and the anode of the thyristor SCR1. The thyristor SCR1 has its gate connected with the cathode of a programmable unijunction transistor PUT1 and also connected through a resistor R2 with the terminal N. The programmable unijunction transistor PUT1 has its gate connected with a slidable point on a variable resistor VR1 which has its opposite ends connected through resistors R3 and R4 with a line P2 and the terminal N, respectively. The programmable unijunction transistor PUT1 has its anode connected with a junction between a variable resistor VR2 and a capacitor C2, both of which are connected in series with a resistor R5 across the line P2 and the terminal N. The capacitor C2 is shunted by a series circuit comprising a normally closed contact RA1-$b$1 associated with a relay coil RA1 and a resistor R6. A constant voltage diode ZD is connected across the line P2 and the terminal N, and a resistor R7 is connected between the lines P1 and P2. The described circuit constitutes a timer TA.

Another thyristor SCR2 has its anode connected through a relay coil RA2 with the line P1 and its cathode connected with the terminal N. A diode D2 has its cathode connected with the line P1 and its anode connected in series with a resistor R8 and a capacitor C3 with the terminal N and also connected with the junction between the relay coil RA2 and the anode of the thyristor SCR2. The thyristor SCR2 has its gate connected with the cathode of another programmable unijunction transistor PUT2 and is also connected through a resistor R9 with the terminal N. The programmable unijunction transistor PUT2 has its gate connected with a slidable point on a variable resistor VR3 which has its opposite ends connected through resistors R10 and R11 with the line P2 and the terminal N, respectively. The anode of the programmable unijunction transistor PUT2 is connected with a junction between a variable resistor VR4 and a capacitor C4, both of which are connected in series with a resistor R12 across the line P2 and the terminal N. The capacitor C4 is shunted by a series circuit comprising a normally closed contact RA4-$b$1 associated with the relay coil RA4 and a resistor R13. The described circuit constitutes a timer TB.

The variable resistors VR2 and VR4 are arranged for interlocked motion with the variable magnification mechanism, while the variable resistors VR1 and VR3 are coupled with the exposure dial. As a result, the timers TA and TB are supplied with the d.c. voltage across the line P1 and the terminal N as stabilized by the resistor R7 and constant voltage diode ZD. When the relay coil RA1 is energized, its normally closed contact RA1-$b$1 is opened, whereby the capacitor C2 commences to charge through the resistors R5 and VR2 from the constant voltage across the line P2 and the terminal N, thereby initiating the operation of the timer TA. At a predetermined time interval after the initiation of the operation, the voltage across the capacitor C2 exceeds the gate voltage of the programmable unijunction transistor PUT1 which is determined by the resistors R3, R4 and variable resistor VR1, thereby rendering this transistor conductive to apply a gate pulse to the thyristor SCR1, which therefore conducts. As a consequence, the relay coil RA4 is energized to open its normally closed contact RA4-$b$1, thereby resetting the relay RA3. The resetting of the relay coil RA3 is somewhat delayed by the discharge of the capacitor C5 through this relay coil. When the relay coil RA3 is deenergized, its normally open contact RA3-$a$1 is opened to extinguish the lamps 13 and 15. The energization of the relay coil RA4 opens its normally closed contact RA4-$b$1, whereby the capacitor C4 commences to charge through the resistor R12 and variable resistor VR4 from the constant voltage across the line P2 and the terminal N, thereby initiating the operation of the timer TB. At a predetermined time interval after the initiation of the operation, the voltage across the capacitor C4 exceeds the gate voltage of the programmable unijunction transistor PUT2 which is determined by the resistors R10, R11 and variable resistor VR3, rendering this transistor conductive to apply a gate pulse to the thyristor SCR2. As a consequence, the thyristor SCR2 conducts to energize the relay coil RA2, whereby its normally closed contact RA2-$b$1 is opened to extinguish the lamps 14 and 16. Subsequently, the relay coil RA1 is deenergized by the reset switch SW2.

It is necessary to have the lamps 13, 15 and the lamps 14, 16 to be illuminated for an equal period of time when copying with a unity magnification. This would require an adjustment of the variable resistor VR4 such that the timer TB times out immediately or with zero period, and while this is impossible, the same effect is achieved by the time delay afforded by the capacitor C5. When the copying magnification is varied by means of the variable magnification mechanism, the variable resistors VR2 and VR4 are moved in interlocked relationship therewith, with the timer TA having a reduced period when the magnification is reduced and the timer TB having an increased period when the magnification is reduced. As a consequence, when the copying magnification is reduced, the differential between the time periods during which the lamps 13, 15 and the lamps 14, 16 are illuminated increases to provide an automatic correction of non-uniform exposure caused by a displacement of the optical axis and to maintain a uniform exposure distribution. By moving the variable resistors VR1 and VR3 concurrently by means of the exposure dial, the gate voltage at which the programmable unijunction transistors PUT1 and PUT2 conduct is varied to change the time periods during which the lamps 13, 15 and the lamps 14, 16 are illuminated without changing the ratio of such time periods relative to each other, thus allowing a desired amount of exposure to be freely established.

In addition to moving the variable resistors in interlocked relationship with the variable magnification mechanism, the uniform exposure distribution can be achieved by providing a plurality of photoconductive elements at different locations on the exposed surface and in alignment with the respective lamps so that these elements detect the amount of incident light to establish respective time periods for control of the time periods during which the corresponding lamps are illuminated.

What is claimed is:

1. An exposure unit for a copying machine having a variable magnification, the exposure unit comprising
   a. an optical system, including a lens having an optical axis, for projecting an image of an original to be copied, said optical system being adjustable, to vary the magnification of the image, in a manner effecting lateral displacement of the optical axis of said lens relative to the original;
   b. a plurality of light sources for illuminating the original, disposed in succession along the path of displacement of said optical axis; and
   c. means for controlling time periods during which the plurality of light sources are energized such that different ones of said light sources respectively disposed at different locations along said path are energizable for respectively different time periods to compensate for displacement of said optical axis and thereby to maintain a uniform exposure distribution.

2. An exposure unit according to claim 1 in which the time periods during which the plurality of light sources are illuminated are controlled in interlocked relationship with the adjustable optical system of the copying machine such that displacement of said optical axis produces corresponding variation in the respective time periods during which different ones of said light sources are energized, thereby to maintain a uniform exposure distribution.

3. An exposure unit according to claim 2, further including a plurality of timers which are interlocked with the adjustable optical system, said timers controlling the respective time periods for the plurality of light sources.

4. An exposure unit according to claim 3, further including an exposure dial which is operative to change the time periods of the plurality of timers without changing the ratio thereof.

5. An exposure unit according to claim 3 in which the timers initiate their operation by a print switch of the copying machine.

6. An exposure unit according to claim 1, wherein said controlling means comprises means for varying the respective time periods of energization of different ones of said light sources respectively disposed at different locations along said path in response to displacement of said optical axis.

7. An exposure unit according to claim 6, further including means for concurrently adjusting the time periods of energization of all of said light sources without varying the relationship between the respective durations of different ones of said time periods.

* * * * *